United States Patent
Kanno et al.

(10) Patent No.: US 10,461,363 B2
(45) Date of Patent: Oct. 29, 2019

(54) SULFIDE SOLID ELECTROLYTE MATERIAL, BATTERY, AND PRODUCING METHOD FOR SULFIDE SOLID ELECTROLYTE MATERIAL

(71) Applicants: TOKYO INSTITUTE OF TECHNOLOGY, Tokyo (JP); TOYOTA JIDOSHA KABUSHIKI KAISHA, Toyota-shi, Aichi-ken (JP)

(72) Inventors: Ryoji Kanno, Yokohama (JP); Masaaki Hirayama, Kawasaki (JP); Kota Suzuki, Yokohama (JP); Satoshi Hori, Machida (JP); Yuki Kato, Gotemba (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 15/319,317

(22) PCT Filed: Jun. 8, 2015

(86) PCT No.: PCT/JP2015/066495
§ 371 (c)(1),
(2) Date: Dec. 15, 2016

(87) PCT Pub. No.: WO2015/198848
PCT Pub. Date: Dec. 30, 2015

(65) Prior Publication Data
US 2017/0155168 A1 Jun. 1, 2017

(30) Foreign Application Priority Data

Jun. 25, 2014 (JP) .................................. 2014-130282
Mar. 6, 2015 (JP) .................................. 2015-045213

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 17/22* (2013.01); *C01B 25/14* (2013.01);
(Continued)

(58) Field of Classification Search
CPC ........... H01M 10/0562; H01M 10/052; H01M 10/0525; H01M 4/62
See application file for complete search history.

(56) References Cited

U.S. PATENT DOCUMENTS

| 2007/0160911 A1 | 7/2007 | Senga et al. |
| 2012/0301796 A1 | 11/2012 | Ohtomo et al. |

(Continued)

FOREIGN PATENT DOCUMENTS

| CN | 103003890 A | 3/2013 |
| CN | 103999279 A | 8/2014 |

(Continued)

OTHER PUBLICATIONS

Ong, Shyue Ping et al., Phase stability, electrochemical stability and ionic conductivity of the Li10+1MP2X12(M=Ge, Si, Sn, Al or P, and X=O, S or Se) family of superionic conductors+, Energy & Environmental Science, Oct. 2, 2012, pp. 148-156, RCSPublishing.
(Continued)

*Primary Examiner* — Jimmy Vo
(74) *Attorney, Agent, or Firm* — Oliff PLC

(57) ABSTRACT

A sulfide solid electrolyte material has favorable ion conductivity and resistance to reduction. The sulfide solid electrolyte material includes a peak at a position of
(Continued)

$2\theta = 29.86° \pm 1.00°$ in X-ray diffraction measurement using a CuKα ray, and a composition of $Li_{2y+3}PS_4$ ($0.1 \leq y \leq 0.175$).

9 Claims, 8 Drawing Sheets

(51) Int. Cl.
*H01M 4/62* (2006.01)
*C01B 17/22* (2006.01)
*H01M 10/052* (2010.01)
*H01M 10/0525* (2010.01)

(52) U.S. Cl.
CPC .......... *H01M 4/62* (2013.01); *H01M 10/052* (2013.01); *H01M 10/0525* (2013.01); *C01P 2002/72* (2013.01); *C01P 2006/40* (2013.01); *H01M 2300/0068* (2013.01); *Y02T 10/7011* (2013.01)

(56) References Cited

U.S. PATENT DOCUMENTS

| | | | |
|---|---|---|---|
| 2013/0040208 A1 | 2/2013 | Kanno et al. | |
| 2013/0164631 A1* | 6/2013 | Ohtomo | H01M 10/0525 429/319 |
| 2013/0164632 A1 | 6/2013 | Kato et al. | |
| 2014/0302382 A1 | 10/2014 | Kambara et al. | |
| 2014/0363745 A1 | 12/2014 | Hirayama et al. | |
| 2015/0037687 A1 | 2/2015 | Kanno et al. | |
| 2015/0147597 A1 | 5/2015 | Otomo et al. | |
| 2015/0357673 A1 | 12/2015 | Kanno et al. | |
| 2016/0068630 A1 | 3/2016 | Carpentier et al. | |
| 2016/0149258 A1 | 5/2016 | Kanno et al. | |
| 2018/0226171 A1 | 8/2018 | Kanno et al. | |
| 2018/0269521 A1 | 9/2018 | Ohtomo et al. | |

FOREIGN PATENT DOCUMENTS

| | | |
|---|---|---|
| CN | 105453324 A | 3/2016 |
| EP | 3007262 A1 | 4/2016 |
| JP | 2005-228570 A | 8/2005 |
| JP | 2008-103096 A | 5/2008 |
| JP | 2011-129312 A | 6/2011 |
| JP | 2013-120700 A | 6/2013 |
| JP | 2013116837 A | 6/2013 |
| JP | 2013-177288 A | 9/2013 |
| KR | 10-2016-0004358 A | 1/2016 |
| KR | 10-2016-0004368 A | 1/2016 |
| TW | 201405911 A | 2/2014 |
| WO | 2009/038037 A1 | 3/2009 |
| WO | 2011/118801 A1 | 9/2011 |
| WO | 2013/069243 A1 | 5/2013 |
| WO | 2013/094757 A1 | 6/2013 |
| WO | 2013/118723 A1 | 8/2013 |
| WO | 2014/112277 A1 | 7/2014 |
| WO | 2014/196442 A1 | 12/2014 |
| WO | 2015/198848 A1 | 12/2015 |

OTHER PUBLICATIONS

Hisanori Yamane et al., "Crystal Structure for a superionic conductor Li7P3S11" Solid State Ionics, vol. 178 (2007), pp. 1163-1167.
Kenji Homma et al., "Crystal Structure and phase transitions of the lithium ionic conductor Li3PS4" Solid State Ionics, vol. 182 (2011), pp. 53-58.
Kenji Homma et al., "Crystal Structure of High-Temperature Phase of Lithium Ionic Conductor, Li3PS4" Physics of Solid State Ionics (2010), vol. 79, pp. 90-93.
Masahiro Maruyama et al., "Material design of new lithium ionic conductor, thio-LISICON, in the Li2S-P2S5 system", Solid State Ionics, vol. 170 (2004), pp. 173-180.
Noriaki Kamaya et al., "A lithium superionic conductor", nature materials, vol. 10, Sep. 2011, pp. 682-686.
Feb. 20, 2019 Office Action issued in U.S. Appl. No. 15/749,457.
R. Mercier et al., "Synthese, structure cristalline et analyse vibrationnelle de l'hexathiohypodiphosphate de lithium Li4P2S6" Journal of Solid State Chemistry, vol. 43, 151-162(1982).
Shiao Tong Kong, "Structural Characterisation of the Li Argyrodites Li7PS6 and Li7Pse6 and their Solid Solutions: Quantificatio of Site Preferences by MAS-NMR Spectroscopy", Chemistry A European Journal(2010), vol. 16, pp. 5138-5147.
Jul. 9, 2019 Office Action issued in U.S. Appl. No. 15/749,457.

* cited by examiner

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable ion conductivity and resistance to reduction.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. In contrast, a lithium battery, namely a battery all-solidified by replacing the liquid electrolyte with a solid electrolyte layer, is conceived to intend the simplification of the safety device and be excellent in production cost and productivity for the reason that the flammable organic solvent is not used in the battery.

A sulfide solid electrolyte material is known as a solid electrolyte material to be used for an all solid lithium battery. Patent Literature 1 discloses a sulfide solid electrolyte material having a specific peak in X-ray diffraction measurement; in particular, resistance to reduction is improved by using a Si element. Patent Literature 2 discloses a sulfide solid electrolyte material having a specific peak in X-ray diffraction measurement; in particular, a LiGePS-based sulfide solid electrolyte material is disclosed. Patent Literature 3 discloses a battery containing a sulfide solid electrolyte material having a specific peak in X-ray diffraction measurement. In particular, a controlling part for controlling the potential of an anode active material layer is arranged so as to prevent reduction decomposition of the sulfide solid electrolyte material and to improve the charge and discharge efficiency. Patent Literature 4 discloses a producing method for a sulfide solid electrolyte material having a first vitrification step of forming a middle body not having $Li_2S$ by adjusting the proportion of $Li_2S$ in the raw material composition.

CITATION LIST

Patent Literatures

Patent Literature 1: Japanese Patent Application Laid-Open (JP-A) No. 2013-177288

Patent Literature 2: WO 2011/118801

Patent Literature 3: JP-A No. 2013-120700

Patent Literature 4: JP-A No. 2011-129312

SUMMARY OF INVENTION

Technical Problem

A solid electrolyte material with favorable ion conductivity is demanded from the viewpoint of achieving higher output of a battery. Patent Literatures 1 to 3 disclose that a sulfide solid electrolyte material having a specific peak in X-ray diffraction measurement has favorable ion conductivity. On the other hand, the problem in the sulfide solid electrolyte material described in Patent Literatures 1 to 3 (particularly LiGePS) is its low resistance to reduction.

The present invention has been made in view of the problem, and the main object thereof is to provide a sulfide solid electrolyte material with favorable ion conductivity and resistance to reduction.

Solution to Problem

To solve the problem, the present invention provides a sulfide solid electrolyte material comprising: a peak at a position of $2\theta=29.86°\pm1.00°$ in X-ray diffraction measurement using a CuKα ray, and a composition of $Li_{2y+3}PS_4$ ($0.1\leq y\leq0.175$).

According to the present invention, providing a crystal phase having a peak in the vicinity of $2\theta=29.86°$ allows a sulfide solid electrolyte material with favorable ion conductivity. Further, the crystal phase is usually constituted with Li, P, and S; thus, for example, the crystal phase allows a sulfide solid electrolyte material with favorable resistance to reduction compared to the case of containing metal elements such as Ge, Si, and Sn.

The invention preferably further comprises a peak at a position of $2\theta=24.01°\pm1.00°$.

Also, the present invention provides a sulfide solid electrolyte material comprising: an octahedron O comprising a Li element and a S element, a tetrahedron $T_1$ comprising a P element and a S element, and a tetrahedron $T_2$ comprising a P element and a S element; the tetrahedron $T_1$ and the octahedron O sharing an edge, and the tetrahedron $T_2$ and the octahedron O containing a crystal structure sharing a corner, and a composition of $Li_{2y+3}PS_4$ ($0.1\leq y\leq0.175$).

According to the present invention, the octahedron O, tetrahedron $T_1$, and tetrahedron $T_2$ having the predetermined crystal structure (three-dimensional structure) allows a sulfide solid electrolyte material with favorable ion conductivity. Further, the crystal structure is constituted with Li, P, and S; thus, for example, the crystal structure allows a sulfide solid electrolyte material with favorable resistance to reduction compared to the case of containing metal elements such as Ge, Si, and Sn.

Also, the present invention provides a battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the above-described sulfide solid electrolyte material.

According to the present invention, usage of the above-described sulfide solid electrolyte material allows a battery with high output, and with high resistance to reduction.

Also, the present invention provides a producing method for a sulfide solid electrolyte material, the sulfide solid electrolyte material being the above-described sulfide solid electrolyte material, comprising: an ion conductive material synthesizing step of synthesizing an ion conductive material not having Li$_2$S using a raw material composition containing a constituent of the sulfide solid electrolyte material by mechanical milling; and a heating step of obtaining the sulfide solid electrolyte material by heating the ion conductive material.

According to the present invention, an ion conductive material not having Li$_2$S is synthesized by mechanical milling, and then a heating step is conducted, so that a sulfide solid electrolyte material provided with a crystal phase having a peak in the vicinity of 2θ=29.86° maybe obtained. Thereby, a sulfide solid electrolyte material with favorable ion conductivity may be obtained. Further, the sulfide solid electrolyte material is usually constituted with Li, P, and S, so that a sulfide solid electrolyte material with favorable resistance to reduction may be obtained.

In the invention, the heating temperature in the heating step is preferably in a range of 230° C. to 300° C.

Advantageous Effects of Invention

The present invention produces the effect such as to allow a sulfide solid electrolyte material with favorable ion conductivity and resistance to reduction to be obtained.

DESCRIPTION OF EMBODIMENTS

Figure 1:
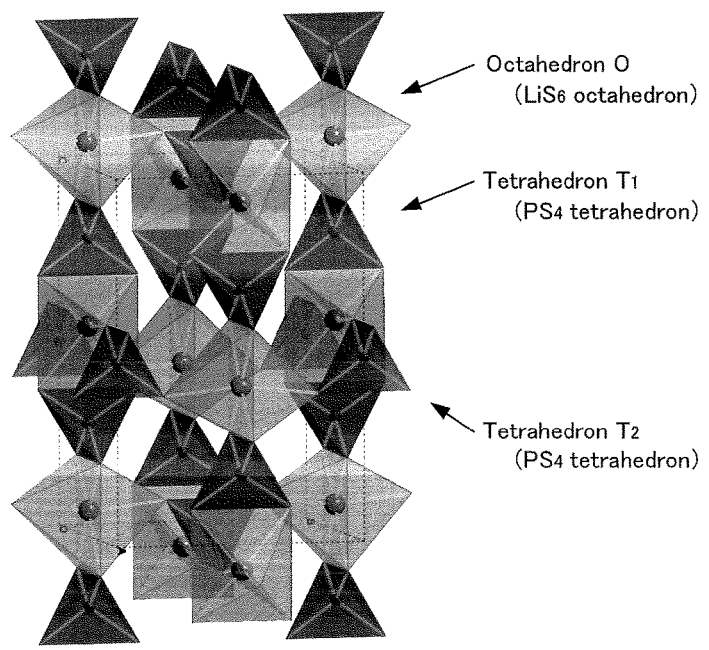
FIG. 1 is a perspective view explaining an example of a crystal structure of a sulfide solid electrolyte material of the present invention.

A sulfide solid electrolyte material, a battery and a producing method for a sulfide solid electrolyte material of the present invention will be hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention will be described while divided into a first embodiment and a second embodiment.

1. First Embodiment

A sulfide solid electrolyte material of a first embodiment comprises a peak at a position of 2θ=29.86°±1.00° in X-ray diffraction measurement using a CuKα ray, and a composition of Li$_{2y+3}$PS$_4$ (0.1≤y≤0.175).

According to the first embodiment, providing a crystal phase having a peak in the vicinity of 2θ=29.86° allows a sulfide solid electrolyte material with favorable ion conductivity. Further, the crystal phase is usually constituted with Li, P, and S; thus, for example, the crystal phase allows a sulfide solid electrolyte material with favorable resistance to reduction compared to the case of containing metal elements such as Ge, Si, and Sn. For example, the LiGePS-based sulfide solid electrolyte material described in Patent Literatures 1 to 3 contains Ge and thus reduction decomposition is easily caused when concurrently using thereof with a low potential anode active material such as a carbon active material. In contrast, a metal element in which the crystal phase is easily reduced is not contained in the first embodiment, so that resistance to reduction is improved.

Here, the sulfide solid electrolyte material described in Patent Literatures 1 to 3 has a crystal structure with high Li ion conductivity. A crystal phase having this crystal structure is regarded as the crystal phase A'. The crystal phase A' usually has a peak at the position of 2θ=17.38°, 20.18°, 20.44°, 23.56°, 23.96°, 24.93°, 26.96°, 29.07°, 29.58°, 31.71°, 32.66°, and 33.39°. Incidentally, these peak positions occasionally shift in a range of ±0.50° since the crystal lattice is slightly changed due to the factors such as a material composition.

The sulfide solid electrolyte material of the first embodiment has a crystal phase A similar to the crystal phase A'. The crystal phase A usually has a peak at the position of 2θ=12.28°, 14.33°, 20.40°, 24.01°, 27.01°, 29.22°, 29.86°, 31.27°, and 33.81°. Incidentally, also these peak positions occasionally shift in a range of ±1.00°, which is preferably in a range of ±0.50°. Also, the patterns in the peak positions of the crystal phase A and crystal phase A' are equivalent, but slightly different. The reason therefor is considered to be that the ion radius of a P element being smaller than the ion radius of a Ge element decreases the lattice constant. Incidentally, the crystal phase A' in the sulfide solid electrolyte materials described in Patent Literature 1 to 3 exhibit high ion conductivity in the manner that a metal ion (Li ion) is conducted in the space part of the crystal structure. The crystal phase A in the sulfide solid electrolyte material of the first embodiment also has the similar structure to the crystal phase A', so that high ion conductivity may be exhibited.

Also, the LiGePS-based sulfide solid electrolyte materials described in Patent Literatures 1 to 3 have a peak in the vicinity of 2θ=27.33°. The crystal phase B' having this peak is a crystal phase with lower ion conductivity than that of the above-described crystal phase A'. Also, the crystal phase B' is considered to usually have a peak at the position of 2θ=17.46°, 18.12°, 19.99°, 22.73°, 25.72°, 27.33°, 29.16°, and 29.78°. Incidentally, also these peak positions occasionally shift in a range of ±0.50°.

The sulfide solid electrolyte material of the first embodiment may possibly have a crystal phase B similar to the crystal phase B'. The crystal phase B is conceived to be in a range of ±1.0° with respect to the peak positions of the crystal phase B'. Incidentally, both the crystal phase A and B are the crystal phase showing ion conductivity, but their ion conductivities differ; it is conceived that the ion conductivity of the crystal phase B is lower than that of the crystal phase A. Accordingly, it is preferable to decrease the proportion of the crystal phase B. In the first embodiment, when a diffraction intensity at a peak in the vicinity of 2θ=29.86° is regarded as $I_A$ and a diffraction intensity at a peak in the vicinity of 2θ=27.33° is regarded as $I_B$, a value of $I_B/I_A$ is less than 0.50 for example, preferably 0.45 or less, more preferably 0.25 or less, and further more preferably 0.15 or less, and particularly preferably 0.07 or less. Also, the value of $I_B/I_A$ is preferably 0. In other words, the sulfide solid electrolyte material of the first embodiment preferably does not have a peak in the vicinity of 2θ=27.33°.

The sulfide solid electrolyte material of the first embodiment usually has a composition of $Li_{2y+3}PS_4$ (0.1≤y≤0.175). This composition corresponds to the composition of $Li_{5x+2y+3}P_{1-x}S_4$ in which "x"=0. This composition may be represented as $Li_{5x+2y+3}P^{(III)}_y P^{(V)}_{1-x-y}S_4$, in a narrow sense. $P^{(III)}$ and $P^{(V)}$ is respectively a trivalent and pentavalent phosphorus. Also, the composition is a composition not falling under the tie line of $Li_2S$ and $P_2S_5$; for example, it is the composition to be obtained when using $Li_2S$, $P_2S_5$, and P. Also, the composition is determined by presupposing pseudo ternary composition of $Li_2S$, $Li_5PS_4$ (ortho composition using a trivalent phosphorous), and $Li_3PS_4$ (ortho composition using a pentavalent phosphorous). That is:

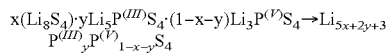

$x(Li_8S_4)\cdot yLi_5P^{(III)}S_4\cdot(1-x-y)Li_3P^{(V)}S_4 \rightarrow Li_{5x+2y+3}P^{(III)}_y P^{(V)}_{1-x-y}S_4$ The value for "x" in the composition is usually 0. Also, "y" in the composition usually satisfies 0.1≤y. On the other hand, "y" in the composition usually satisfies y≤0.175.

The sulfide solid electrolyte material of the first embodiment is usually a sulfide solid electrolyte material having crystallinity. Also, the sulfide solid electrolyte material of the first embodiment is preferably high in ion conductivity; the ion conductivity of the sulfide solid electrolyte material at 25° C. is preferably $6.0\times10^{-4}$ S/cm or more, and more preferably $1.0\times10^{-3}$ S/cm or more. Also, the shape of the sulfide solid electrolyte material of the first embodiment is not particularly limited, but examples thereof may include a powder shape. Further, the average particle diameter of the powdery sulfide solid electrolyte material is preferably in a range of 0.1 μm to 50 μm for example.

The sulfide solid electrolyte material of the first embodiment has favorable ion conductivity so as to be applied to an arbitrary use that requires ion conductivity. Above all, the sulfide solid electrolyte material of the first embodiment is preferably capable of being used for a battery. The reason therefor is to enable great contribution to increase a battery output. Also, a producing method for the sulfide solid electrolyte material of the first embodiment will be described in the later-described "C. Producing method for sulfide solid electrolyte material" in details. Also, the sulfide solid electrolyte material of the first embodiment may be provided with the characteristics of the later-described second embodiment as well.

2. Second Embodiment

Next, a second embodiment of the sulfide solid electrolyte material of the present invention will be described.

FIG. 1 is a perspective view explaining an example of a crystal structure of the sulfide solid electrolyte material of the second embodiment. In the crystal structure shown in FIG. 1, the octahedron O is a $LiS_6$ octahedron having Li as a central element, and 6 pieces of S at the apexes of the octahedron. The tetrahedron $T_1$ is a $PS_4$ tetrahedron having P as a central element, and 4 pieces of S at the apexes of the tetrahedron. The tetrahedron $T_2$ is a $PS_4$ tetrahedron having P as a central element, and 4 pieces of S at the apexes of the tetrahedron. In the second embodiment, the tetrahedron $T_1$ and the octahedron O share the edge, and the tetrahedron $T_2$ and the octahedron O share the corner.

According to the second embodiment, the octahedron O, tetrahedron $T_1$, and tetrahedron $T_2$ having the specific crystal structure (three-dimensional structure) allows a sulfide solid electrolyte material with favorable ion conductivity. Further, the crystal structure is constituted with Li, P, and S; thus, for example, the crystal structure allows a sulfide solid electrolyte material with favorable resistance to reduction compared to the case of containing metal elements such as Ge, Si, and Sn.

The sulfide solid electrolyte material of the second embodiment is not particularly limited if it has the crystal structure. Also, the sulfide solid electrolyte material of the second embodiment preferably contains the crystal structure as the main body. "Containing the crystal structure as the main body" signifies that the proportion of the crystal structure is the largest with respect to all the crystal phases included in a sulfide solid electrolyte material. The proportion of the crystal structure is 50 wt % or more for example, preferably 70 wt % or more, and more preferably 90 wt % or more. Incidentally, the proportion of the crystal structure may be measured by synchrotron radiation XRD, for example. In particular, the sulfide solid electrolyte material of the second embodiment is preferably a single phase material of the crystal structure. The reason therefor is to further improve the ion conductivity. Also, the sulfide solid electrolyte material of the second embodiment may be provided with the characteristics of the above-described first embodiment as well.

B. Battery

Next, a battery of the present invention will be described.

Figure 2:
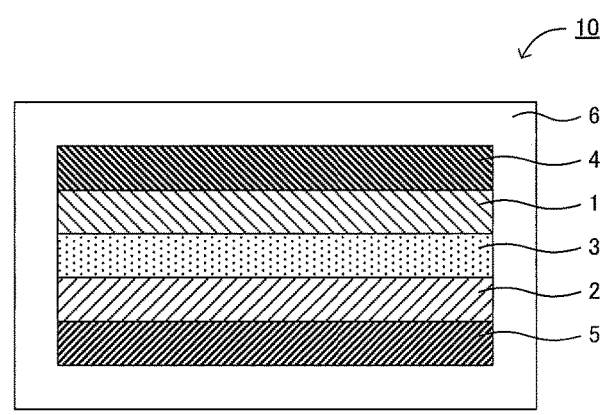
FIG. 2 is a schematic cross-sectional view illustrating an example of a battery of the present invention.

FIG. 2 is a schematic cross-sectional view illustrating an example of a battery of the present invention. Battery 10 in FIG. 2 has cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present invention features the configuration that at least one of cathode active material layer 1, anode active material layer 2, and electrolyte layer 3 contains the sulfide solid electrolyte material described in the "A. Sulfide solid electrolyte material".

According to the present invention, usage of the above-described sulfide solid electrolyte material allows a battery with high output and high resistance to reduction.

The battery of the present invention will be hereinafter described in each constitution.

1. Anode Active Material Layer

An anode active material layer in the present invention is a layer containing at least an anode active material; it may contain at least one of a solid electrolyte material, conductive material, and binder as required. In particular, in the present invention, it is preferable that the anode active material layer contains a solid electrolyte material that is the above-described sulfide solid electrolyte material. The reason therefor is because the sulfide solid electrolyte material is high in resistance to reduction. The proportion of the sulfide solid electrolyte material to be contained in the anode active material layer varies in accordance with the kinds of a battery, but is in a range of 0.1 volume % to 80 volume % for example; above all, preferably in a range of 1 volume % to 60 volume %, and particularly preferably in a range of 10 volume % to 50 volume %. Also, examples of the anode active material may include a metal active material and a carbon active material. Examples of the metal active material may include In, Al, Si, and Sn. On the other hand, examples of the carbon active material may include mesocarbon microbeads (MCMB), highly oriented pyrolytic graphite (HOPG), a hard carbon and soft carbon.

The anode active material layer may further contain a conductive material. Addition of a conductive material may improve the conductivity of the anode active material layer. Examples of the conductive material may include acetylene black, Ketjen black, and carbon fiber. Also, the anode active material layer may contain a binder. Examples of the kinds of the binder may include a fluoride containing binder such as polyvinylidene fluoride (PVDF). Also, the thickness of the anode active material layer is preferably in a range of 0.1 μm to 1000 μm, for example.

2. Electrolyte Layer

An electrolyte layer in the present invention is a layer formed between a cathode active material layer and the anode active material layer. The electrolyte layer is not particularly limited if the layer is capable of conducting ion, but preferably a solid electrolyte layer constituted with a solid electrolyte material. The reason therefor is to obtain a battery with higher safety compared to a battery utilizing a liquid electrolyte. Further, in the present invention, the solid electrolyte layer preferably contains the above-described sulfide solid electrolyte material. The proportion of the sulfide solid electrolyte material to be contained in the electrolyte layer is in a range of 10 volume % to 100 volume % for example, and preferably in a range of 50 volume % to 100 volume % above all. The thickness of the solid electrolyte layer is in a range of 0.1 μm to 1000 μm for example, and preferably in a range of 0.1 μm to 300 μm above all. Also, examples of the forming method for the solid electrolyte layer may include a method such that a solid electrolyte material is compressed and molded.

Also, the electrolyte layer in the present invention may be a layer constituted with a liquid electrolyte. If a liquid electrolyte is used, it is necessary to further care for the safety compared to the case of using a solid electrolyte layer, but a battery with higher output may be obtained. Also, in this case, usually at least one of the cathode active material layer and the anode active material layer should contain the above-described sulfide solid electrolyte material. The liquid electrolyte usually contains a lithium salt and an organic solvent (non-aqueous solution). Examples of the lithium salt may include an inorganic lithium salt such as $LiPF_6$, $LiBF_4$, $LiClO_4$, and $LiAsF_6$, and an organic lithium salt such as $LiCF_3SO_3$, $LiN(CF_3SO_2)_2$, $LiN(C_2F_5SO_2)_2$, and $LiC(CF_3SO_2)_3$. Examples of the organic solvent may include ethylene carbonates (EC), propylene carbonates (PC), dimethyl carbonates (DMC), diethyl carbonates (DEC), ethyl methyl carbonates (EMC), and butylene carbonates (BC).

3. Cathode Active Material Layer

A cathode active material layer in the present invention is a layer containing at least a cathode active material; it may contain at least one of a solid electrolyte material, conductive material, and binder as required. In particular, in the present invention, it is preferable that the cathode active material layer contains a solid electrolyte material that is the above-described sulfide solid electrolyte material. The proportion of the sulfide solid electrolyte material to be contained in the cathode active material layer varies in accordance with the kinds of a battery, but is in a range of 0.1 volume % to 80 volume % for example; above all, preferably in a range of 1 volume % to 60 volume %, and more preferably in a range of 10 volume % to 50 volume %. Also, examples of the cathode active material may include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$. Incidentally, the conductive material and binder to be used in for the cathode active material layer are the same as in the case of the above-described anode active material layer. Also, the thickness of the cathode active material layer is preferably in a range of 0.1 μm to 1000 μm, for example.

4. Other Constitution

A battery of the present invention has at least the above-described anode active material layer, electrolyte layer, and cathode active material layer. The battery usually further has a cathode current collector for collecting currents of the cathode active material layer and an anode current collector for collecting currents of the anode active material layer. Examples of the material for the cathode current collector may include SUS, aluminum, nickel, iron, titanium, and carbon. On the other hand, examples of the material for the anode current collector may include SUS, copper, nickel, and carbon. Also, the thickness and shape of the cathode current collector and anode current collector are preferably selected properly in accordance with the use of a battery. Also, a battery case for a general battery may be used for a battery case to be used for the present invention. Examples of the battery case may include a battery case made of SUS.

5. Battery

The battery of the present invention may be a primary battery or a secondary battery, but preferably a secondary battery among them. The reason therefor is to be repeatedly charged and discharged and be useful as a car-mounted battery, for example. Examples of the shape of the battery of the present invention may include a coin shape, a laminate shape, a cylindrical shape and a rectangular shape. Also, a producing method for the battery of the present invention is not particularly limited if the method is such as to allow the battery described above to be obtained, and the same method as a producing method for a general battery may be used. For example, if the battery of the present invention is an all solid state battery, examples of a producing method therefor may include a method such that a material comprising a cathode active material layer, a material comprising a solid electrolyte layer and a material comprising an anode active material layer are sequentially pressed to thereby produce a power generating element, and this power generating element is stored inside a battery case, which is crimped.

C. Producing Method for Sulfide Solid Electrolyte Material

Next, a producing method for a sulfide solid electrolyte material of the present invention will be described.

Figure 3:
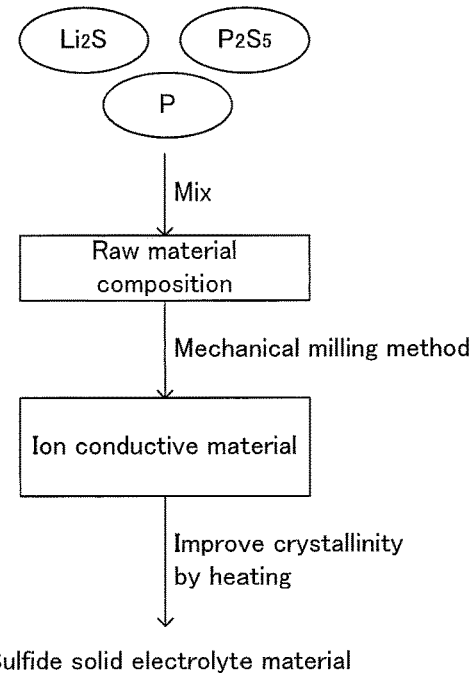
FIG. 3 is an explanatory view illustrating an example of a producing method for a sulfide solid electrolyte material of the present invention.

FIG. 3 is an explanatory view illustrating an example of a producing method for a sulfide solid electrolyte material of the present invention. In the producing method for a sulfide solid electrolyte material in FIG. 3, first, a raw material composition is produced by mixing $Li_2S$, $P_2S_5$, and P. On this occasion, the raw material composition is preferably produced under an inert gas atmosphere in order to prevent the raw material composition from being deteriorated by the moisture in the air. Next, an ion conductive material not having $Li_2S$ is obtained by a mechanical milling method using the raw material composition. Then, the ion conductive material is heated so as to improve the crystallinity, and a sulfide solid electrolyte material is obtained thereby.

According to the present invention, an ion conductive material not having $Li_2S$ is synthesized by a mechanical milling method, and then heating step is conducted thereto, thus a sulfide solid electrolyte material provided with a crystal phase having a peak in the vicinity of $2\theta=29.86°$ may be obtained. Thereby, a sulfide solid electrolyte material with favorable ion conductivity may be obtained. Further, a sulfide solid electrolyte material is usually constituted with Li, P, and S; thus, a sulfide solid electrolyte material with favorable resistance to reduction may be obtained.

The producing method for a sulfide solid electrolyte material of the present invention will be hereinafter described in each step.

1. Ion Conductive Material Synthesizing Step

First, an ion conductive material synthesizing step in the present invention will be described. The ion conductive material synthesizing step in the present invention is a step of synthesizing an ion conductive material not having $Li_2S$ using a raw material composition containing a constituent of the sulfide solid electrolyte material by mechanical milling.

The raw material composition in the present invention contains a Li element, P element, and S element. Examples of the compound containing a Li element may include a sulfide of Li. Specific examples of the sulfide of Li may include $Li_2S$. Also, examples of the compound containing a P element may include a simple substance of P and a sulfide of P. Specific examples of the sulfide of P may include $P_2S_5$. The compound containing a S element is not particularly limited; it may be a simple substance, and may be a sulfide. Examples of the sulfide may include a sulfide containing the above-described element.

Mechanical milling is a method of grinding a test sample while applying a mechanical energy thereto. In the present invention, an amorphized ion conductive material is synthesized by applying a mechanical energy to the raw material composition. Examples of such mechanical milling may include vibrating mill, ball mill, turbo mill, mechano-fusion, and disk mill; above all, ball mill and vibrating mill are preferable.

Also, in the present invention, an ion conductive material not having $Li_2S$ is synthesized. "Not having $Li_2S$" means not having $Li_2S$ to the extent so as to obtain the crystal phase A (a crystal phase having a peak in the vicinity of $2\theta=29.86°$; specifically, it signifies that either the intensity $I_1$ of a peak derived from $Li_2S$ (peak in the vicinity of $2\theta=26.6°$) is 110 cps or less in the XRD measurement under later-described condition, or the peak is not observed at all. Incidentally, it may be determined by the later-described intensity $I_2$ instead of the intensity $I_1$. The intensity $I_1$ and $I_2$ are preferably smaller. Also, in the present invention, decreasing $Li_2S$ included in the ion conductive material as much as possible allows an environment for easily producing the crystal phase A. If $Li_2S$ remains, it is conceived that the reaction does not occur in the heating treatment afterwards since the $Li_2S$ crystal is stable. As the result, the whole composition is shifted and the crystal phase A may not be obtained in some cases. In contrast, it is presumed that decreasing $Li_2S$ included in the ion conductive material as much as possible allows an environment for easily producing the crystal phase A.

The conditions of ball mill are not particularly limited if the conditions are such as to allow the desired ion conductive material to be obtained. Generally, larger number of revolutions brings higher production rate of the ion conductive material, and longer treating time brings higher conversion rate of the raw material composition into the ion conductive material. The number of weighing table revolutions in performing planetary ball mill is in a range of 200 rpm to 500 rpm, for example, and preferably in a range of 250 rpm to 400 rpm, above all. Also, the treating time in performing planetary ball mill is in a range of 1 hour to 100 hours, for example, and preferably in a range of 1 hour to 70 hours, above all.

The conditions of vibrating mill are not particularly limited if the conditions are such as to allow the desired ion conductive material to be obtained. The vibration amplitude of vibrating mill is in a range of 5 mm to 15 mm, for example, and preferably in a range of 6 mm to 10 mm above all. The vibration frequency of vibrating mill is in a range of 500 rpm to 2000 rpm, for example, and preferably in a range of 1000 rpm to 1800 rpm above all. The filling factor of a test sample of vibrating mill is in a range of 1 volume % to 80 volume % for example; above all, preferably in a range of 5 volume % to 60 volume %, and particularly preferably in a range of 10 volume % to 50 volume %. Also, a vibrator (such as a vibrator made of alumina) is preferably used for vibrating mill. In the present invention, ball mill and vibrating mill may be combined.

2. Heating Step

A heating step in the present invention is a step of obtaining the sulfide solid electrolyte material by heating the ion conductive material.

The heating temperature in the present invention is not particularly limited if the heating temperature is such as to allow the crystal phase A (a crystal phase having a peak in the vicinity of $2\theta=29.86°$) to be obtained. Specifically, the heating temperature is preferably 230° C. or more, more preferably 240° C. or more, and further more preferably 250° C. or more. On the other hand, the heating temperature is preferably 300° C. or less, more preferably 280° C. or less, and further more preferably 260° C. or less. Also, the heating time is preferably adjusted appropriately so as to allow the desired sulfide solid electrolyte material to be obtained; for example, it is preferably in a range of 30 minutes to 10 hours. Also, heating in the present invention is preferably performed under an inert gas atmosphere or in a vacuum from the viewpoint of preventing oxidation. Also, the sulfide solid electrolyte material to be obtained by the present invention is in the same contents as those described in the 'A. Sulfide solid electrolyte material'; thus, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention will be hereinafter described in more details with reference to examples.

Example 1-1

Lithium sulfide ($Li_2S$, manufactured by Nippon Chemical Industrial Co., Ltd.), phosphorus pentasulfide ($P_2S_5$, manufactured by Sigma-Aldrich Co. LLC.), and red phosphorus (P, manufactured by Kojundo Chemical Lab. Co., Ltd.) were used as the starting materials. These powders were mixed in a glove box under an argon atmosphere at the weight ratio shown in Table 1 to obtain a raw material composition. Next, 1 g of the raw material composition was put in a pot made of zirconia (45 ml) together with zirconia balls (10 mmϕ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Next, the pot was opened to collect the test sample stuck on the wall surface; the test sample was grinded for 2 hours using a vibrating milling machine (manufactured by Cosmic Mechanical Technology. Co, Ltd.), then returned to the pot (uniform treatment). The mechanical milling and the uniform treatment were repeated three times in total. An amorphized ion conductive material was obtained thereby.

The obtained ion conductive material was put in a carbon-coated quartz tube and vacuum-sealed. The pressure of the vacuum-sealed quartz tube was approximately 30 Pa. Next, the quartz tube was placed in a burning furnace, heated from room temperature to 260° C. taking 6 hours, maintained at 260° C. for 4 hours, and thereafter slowly cooled to room temperature. A sulfide solid electrolyte material having a composition of $Li_{3.2}PS_4$ was obtained thereby. This composition corresponds to $Li_{5x+2y+3}P_{1-x}S_4$ in which "x"=0 and "y"=0.1.

Examples 1-2 to 1-4

A sulfide solid electrolyte material was obtained in the same manner as in Example 1-1, except that the heating temperature was changed to 230° C., 250° C., and 300° C.

Comparative Example 1

A sulfide solid electrolyte material was obtained in the same manner as in Example 1-1, except that the number of the mechanical milling and uniform treatment was changed to twice (80 hours).

Example 2-1

A sulfide solid electrolyte material was obtained in the same manner as in Example 1-1, except that the proportion of the starting materials was changed to the weight ratio shown in Table 1. The composition of the obtained sulfide solid electrolyte material was $Li_{3.3}PS_4$, which corresponded to $Li_{5x+2y+3}P_{1-x}S_4$ in which "x"=0 and "y"=0.15.

Examples 2-2 and 2-3

A sulfide solid electrolyte material was obtained in the same manner as in Example 2-1, except that the heating temperature was changed to 230° C. and 300° C.

Example 3

Figure 4:
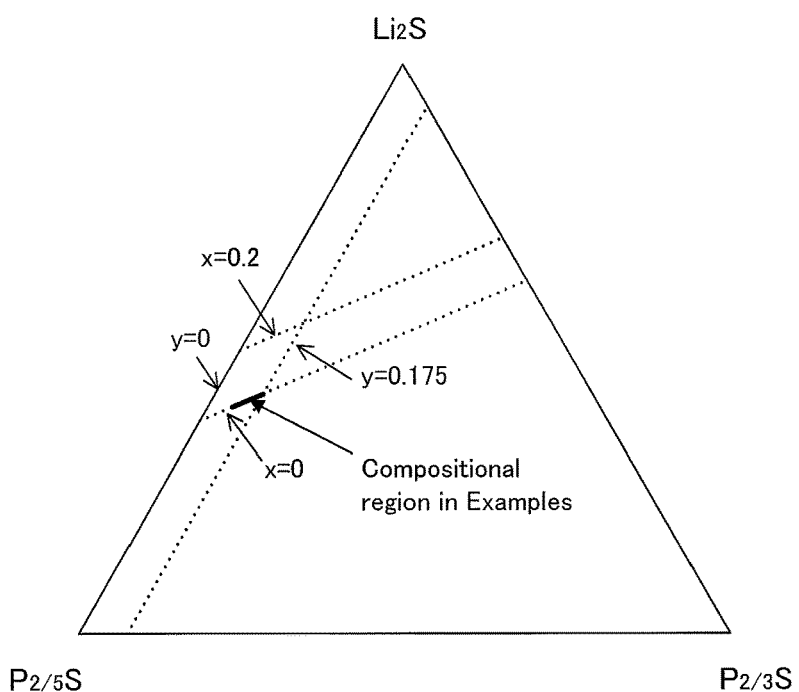
FIG. 4 is a ternary diagram showing the compositional region in Examples 1-1 to 1-4, 2-1 to 2-3, and 3.

A sulfide solid electrolyte material was obtained in the same manner as in Example 1-1, except that the proportion of the starting materials was changed to the weight ratio shown in Table 1. The composition of the obtained sulfide solid electrolyte material was $Li_{3.35}PS_4$, which corresponded to $Li_{5x+2y+3}P_{1-x}S_4$ in which "x"=0 and "y"=0.175. Incidentally, the compositional region in Examples 1-1 to 1-4, 2-1 to 2-3, and 3 are shown in FIG. 4.

Comparative Example 2

A sulfide solid electrolyte material was obtained in the same manner as in Example 1-1, except that the proportion of the starting materials was changed to the weight ratio shown in Table 1. The composition of the obtained sulfide solid electrolyte material was $Li_3PS_4$, which corresponded to $Li_{5x+2y+3}P_{1-x}S_4$ in which "x"=0 and "y"=0.

TABLE 1

| | Examples 1-1 to 1-4, and Comparative Example 1 | Examples 2-1 to 2-3 | Example 3 | Comparative Example 2 |
|---|---|---|---|---|
| Composition | $Li_{3.2}PS_4$ | $Li_{3.3}PS_4$ | $Li_{3.35}PS_4$ | $Li_3PS_4$ |
| x | 0 | 0 | 0 | 0 |
| y | 0.1 | 0.15 | 0.175 | 0 |
| $Li_2S$ | 0.4058 | 0.4161 | 0.4217 | 0.3828 |
| $P_2S_5$ | 0.5872 | 0.5737 | 0.5663 | 0.6172 |
| P | 0.0070 | 0.0102 | 0.0119 | 0 |

Reference Example

Lithium sulfide ($Li_2S$, manufactured by Nippon Chemical Industrial Co., Ltd.), phosphorus pentasulfide ($P_2S_5$, manufactured by Sigma-Aldrich Co. LLC.), and germanium sulfide ($GeS_2$, manufactured by Kojundo Chemical Lab. Co., Ltd.) were used as the starting materials. These powders were mixed in a glove box under an argon atmosphere at the ratio of: 0.390529 g of $Li_2S$, 0.366564 g of $P_2S_5$, and 0.242907 g of $GeS_2$, to obtain a raw material composition. Next, 1 g of the raw material composition was put in a pot made of zirconia (45 ml) together with zirconia balls (10 mm ϕ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. An amorphized ion conductive material was obtained thereby.

Next, the obtained ion conductive material powder was put in a carbon-coated quartz tube and vacuum-sealed. The pressure of the vacuum-sealed quartz tube was approximately 30 Pa. Next, the quartz tube was placed in a burning furnace, heated from room temperature to 550° C. taking 6 hours, maintained at 550° C. for 8 hours, and thereafter slowly cooled to room temperature. A sulfide solid electrolyte material having a composition of $Li_{3.35}Ge_{0.35}P_{0.65}S_4$ was obtained thereby.

[X-ray Diffraction Measurement]

X-ray diffraction (XRD) measurement was performed for the powder test sample under an inert atmosphere on the condition of using a CuKα ray. The measurement conditions were as follows.

<Measurement Conditions>
Measurement device: XRD apparatus manufactured by Rigaku Corporation (Smart Lab)
Detection apparatus: Conductor detecting apparatus (D/teX Ultra)
X-ray wave length: CuKα
Measurement step: 0.01°
Speed counting hour: 5
IS (incident slit) : ⅓
RS (light receiving slit) 1: 8 mm
RS (light receiving slit) 2: 13 mm
Tube voltage: 45 kV
Tube current: 200 mA

[Li Ion Conductance Measurement]

Li ion conductance was measured as follows. First, the sulfide solid electrolyte material was weighed to 200 mg, put in a cylinder made of macole, and pressed at a pressure of 4 ton/cm$^2$. Both edges of the obtained pellet were held between a pin made of SUS, and confining pressure was applied to the pellet by bolting to obtain an evaluation cell. Li ion conductance was calculated by an alternating current impedance method in a state of maintaining the evaluation cell at 25° C. Solartron 1260™ was used for the measurement; applied voltage was 5 mV and measuring frequency band was 0.01 to 1 MHz.

[Evaluation]

Figure 5A:
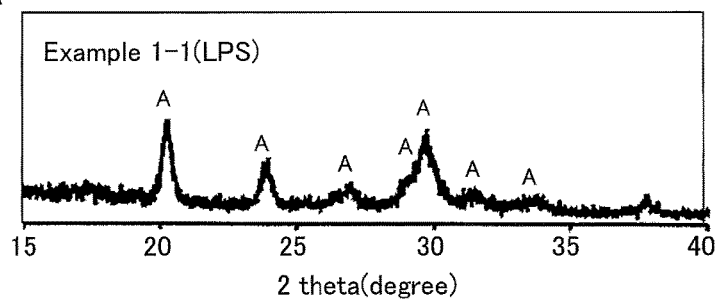
FIGS. 5A and 5B are the result of XRD measurement for the sulfide solid electrolyte material obtained in Example 1-1 and Reference Example.
Figure 5B:
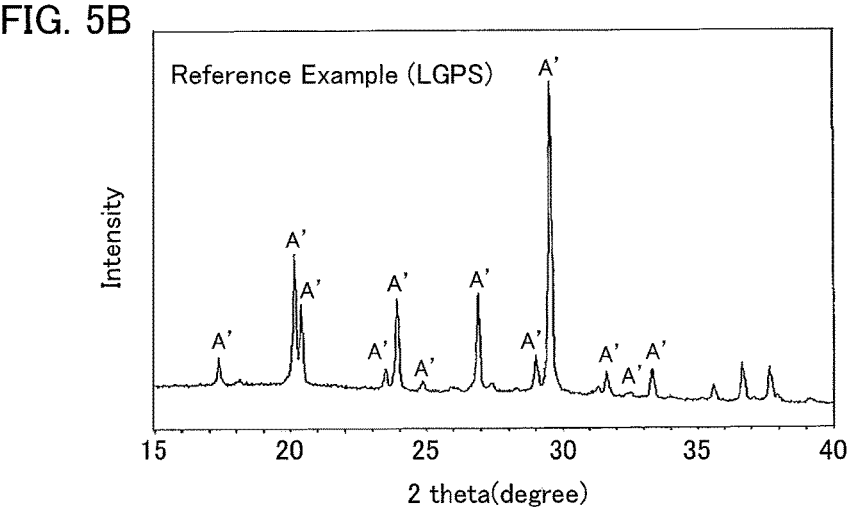

The results of the XRD measurement for the sulfide solid electrolyte materials obtained in Example 1-1 and Reference Example are shown in FIGS. 5A and 5B. As shown in FIG. 5A, peaks at the positions of 2θ=20.40°, 24.01°, 27.01°, 29.22°, 29.86°, 31.27°, and 33.81° appeared in Example 1-1. These peaks are the peaks of the crystal phase A with high ion conductivity. Incidentally, though not illustrated in FIG. 5A, the peaks at 2θ=12.28° and 14.33° are also the peaks of the crystal phase A with high ion conductivity. Also, the peaks of the crystal phase B with low ion conductivity were not confirmed. On the other hand, FIG. 5B is the result of the XRD measurement for the sulfide solid electrolyte material obtained in Reference Example, and the peaks of the crystal phase A' which almost matched those of the crystal phase A were obtained. Specifically, the crystal phase A' has a peak at the position of 2θ=17.38°, 20.18°, 20.44°, 23.56°, 23.96°, 24.93°, 26.96°, 29.07°, 29.58°, 31.71°, 32.66°, and 33.39°.

Figure 6:
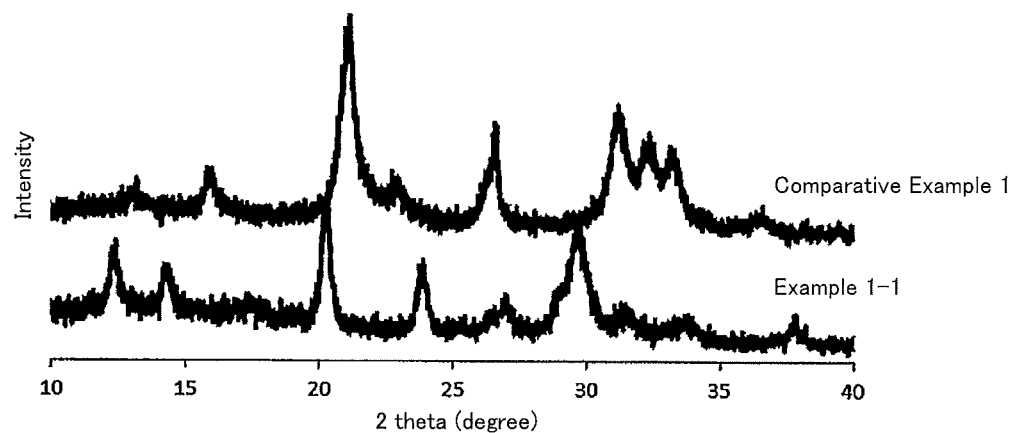
FIG. 6 is the result of XRD measurement fnr the sulfide solid electrolyte material obtained in Example 1-1 and Comparative Example 1.
Figure 7A:
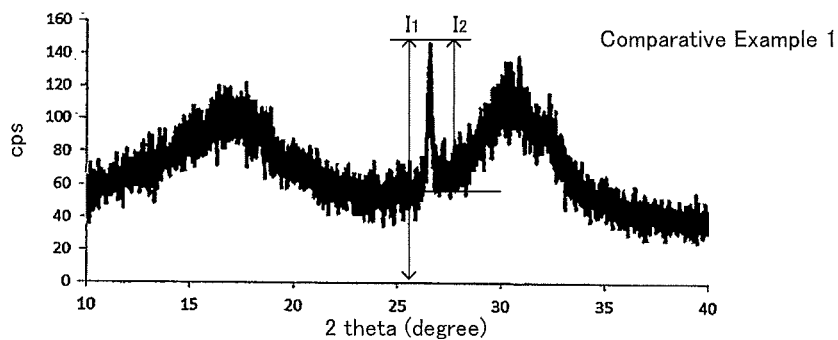
FIGS. 7A and 7B are the result of XRD measurement for the sample (amorphized ion conductive material) in Example 1-1 and Comparative Example 1 before the heating treatment.
Figure 7B:
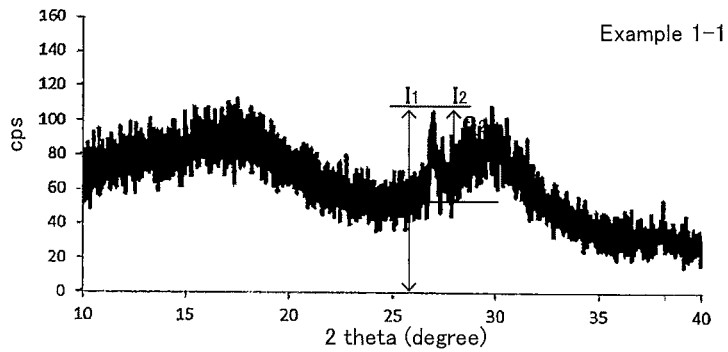

Next, the result of the XRD measurement for the sulfide solid electrolyte material obtained in Example 1-1 and Comparative Example 1 is shown in FIG. 6. As shown in FIG. 6, the peak of the crystal phase A was not confirmed in Comparative Example 1. Then, XRD measurement was conducted for the sample in Example 1-1 and Comparative Example 1 before the heating treatment (for the amorphized ion conductive material). The result is shown in FIGS. 7A and 7B. As shown in FIG. 7A, the peak derived from Li$_2$S (peak in the vicinity of 2θ=26.6° was observed in Comparative Example 1. The intensity I$_1$ of this peak was approximately 145 cps. Also, the intensity I$_2$ from the bottom of this peak was approximately 90 cps. On the other hand, as shown in FIG. 7B, the peak derived from Li$_2$S (peak in the vicinity of 2θ=26.6° was hardly observed in Example 1-1. The intensity I$_1$ of this peak was approximately 110 cps. Also, the intensity I$_2$ from the bottom of this peak was approximately 60 cps.

Figure 8:
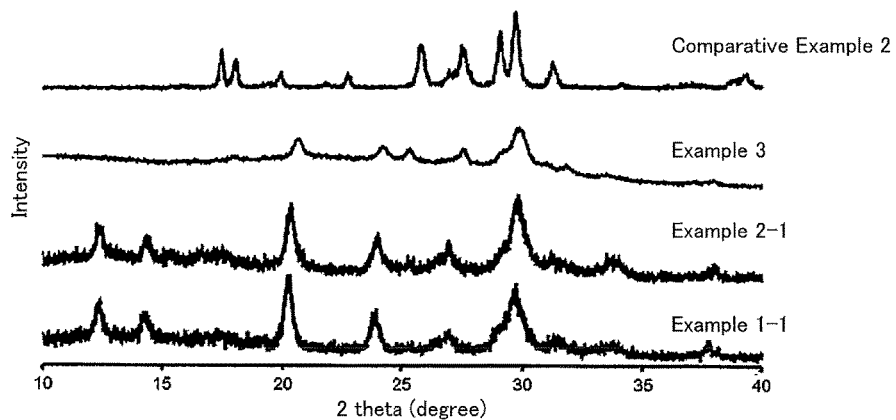
FIG. 8 is the result of XRD measurement for the sulfide solid electrolyte material obtained in Examples 1-1, 2-1, 3, and Comparative Example 2.
Figure 9:
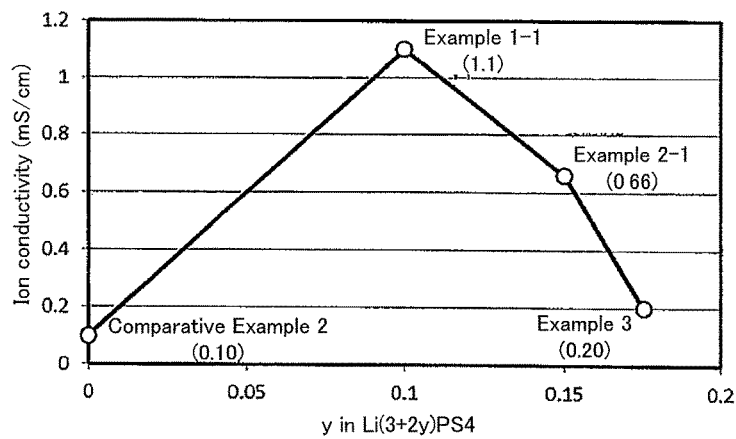
FIG. 9 is the result of Li ion conductivity measurement for the sulfide solid electrolyte material obtained in Examples 1-1, 2-1, 3, and Comparative Example 2.

Next, the result of the XRD measurement for the sulfide solid electrolyte material obtained in Examples 1-1, 2-1, 3, and Comparative Example 2 is shown in FIG. 8. As shown in FIG. 8, the crystal phase A was obtained in Example 1-1, 2-1, and 3, but not in Comparative Example 2. Also, as shown in FIG. 9, higher Li ion conductivity was shown in Example 1-1, 2-1, and 3 than in Comparative Example 2. Also, particularly in Example 1-1, remarkably high Li ion conductance of 1×10$^{-3}$ S/cm or more was obtained.

Figure 10:
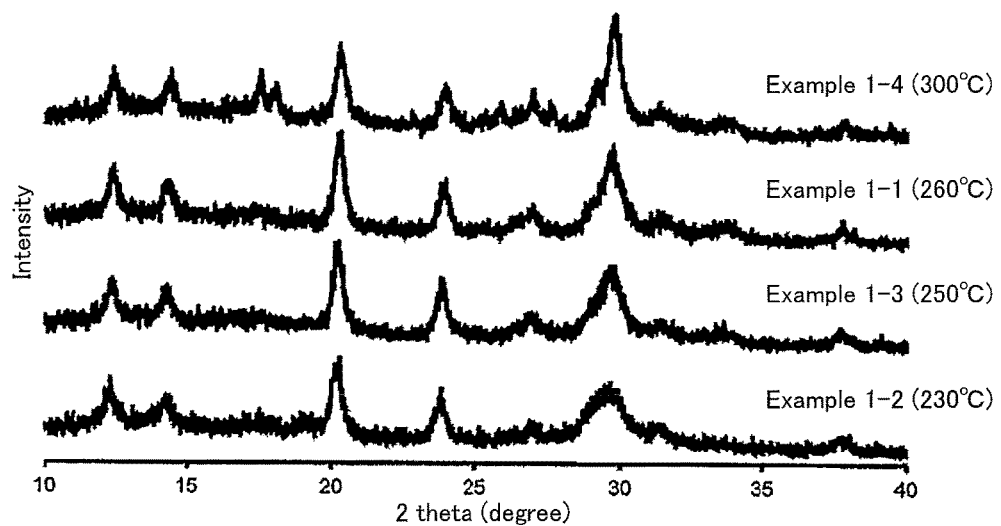
FIG. 10 is the result of XRD measurement for the sulfide solid electrolyte material obtained in Examples 1-1 to 1-4.
Figure 11:
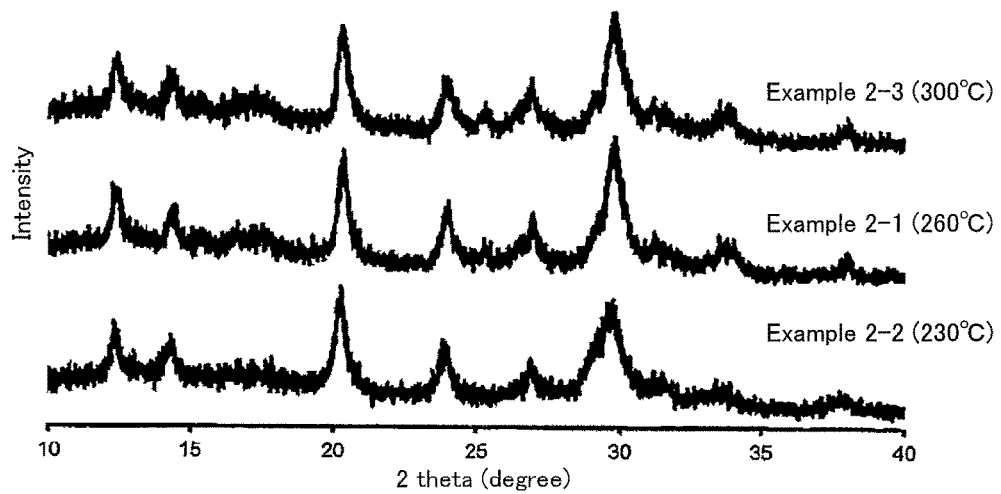
FIG. 11 is the result of XRD measurement for the sulfide solid electrolyte material obtained in Examples 2-1 to 2-3.
Figure 12:
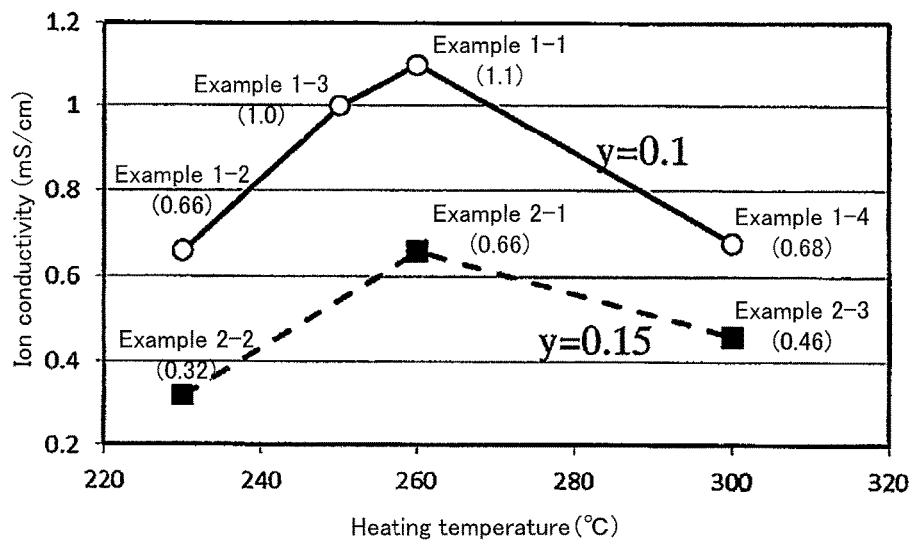
FIG. 12 is the result of Li ion conductivity measurement for the sulfide solid electrolyte material obtained in Examples 1-1 to 1-4 and 2-1 to 2-3.

Next, the results of the XRD measurement for the sulfide solid electrolyte materials obtained in Examples 1-1 to 1-4 and 2-1 to 2-3 are shown in FIG. 10 and FIG. 11. As shown in FIG. 10 and FIG. 11, the crystal phase A was obtained in all Examples. Also, as shown in FIG. 12, particularly high Li ion conductance was obtained when the heating temperature was in a range of 250° C. to 260° C. It is presumed that when the heating temperature is too low, the Li ion conductivity decreases since the crystallinity decreases; when the heating temperature is too high, the Li ion conductivity decreases since other crystal phase is deposited.

Figure 13:
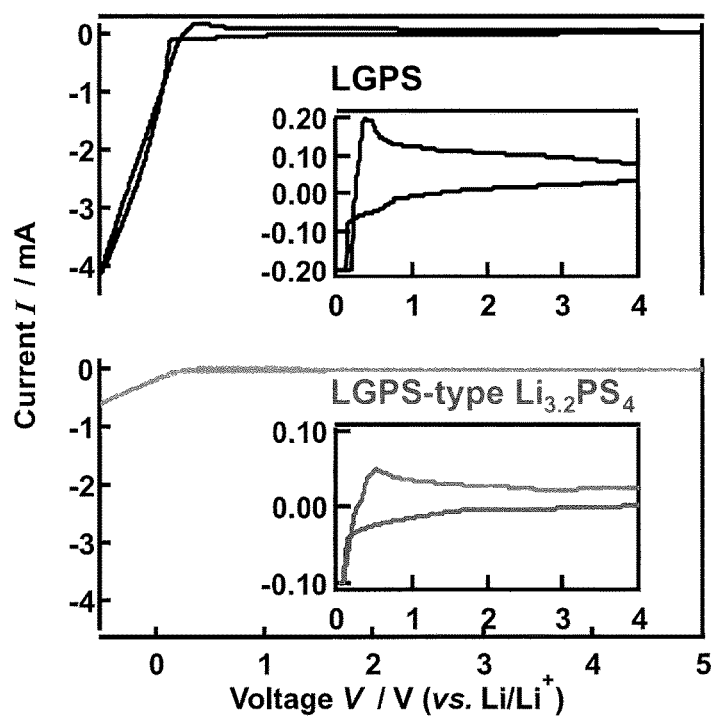
FIG. 13 is the result of CV measurement for the sulfide solid electrolyte material obtained in Example 1-1 and Reference Example.

Also, a cyclic voltammetry (CV) measurement was performed for the sulfide solid electrolyte material obtained in Example 1-1 and Reference Example. Specifically, a sample of Li/sulfide solid electrolyte material/Au was produced and measured at the sweeping speed of 1 mV/sec. The result is shown in FIG. 13. As shown in FIG. 13, the current change in the vicinity of 0 V was small in Example 1-1 compared to Reference Example, and thus the high resistance to reduction was confirmed.

Figure 14:
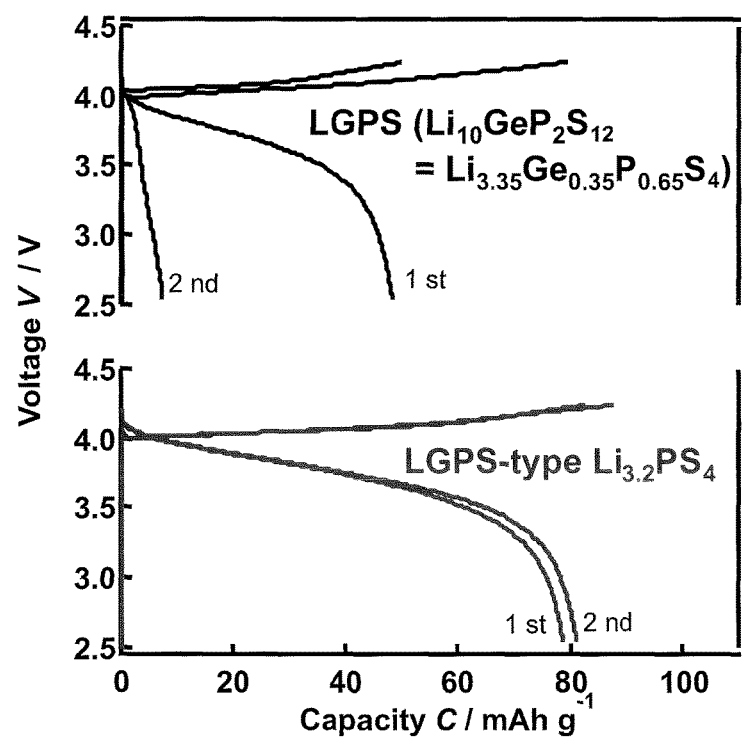
FIG. 14 is the result of charge and discharge measurement for an evaluation battery using the sulfide solid electrolyte material obtained in Example 1-1 and Reference Example.

Also, an evaluation battery was produced by using the sulfide solid electrolyte material obtained in Example 1-1 and Reference Example, and charge and discharge test was conducted therefor. The constitution of the battery was Li/sulfide solid electrolyte material/LiCoO$_2$, and the batter was charged and discharged at 1/20 C (=7.25 mA/g). The result is shown in FIG. 14. As shown in FIG. 14, high capacity was achieved and the cycle property was more excellent in Example 1-1 compared to Reference Example. Consequently, it was confirmed that the sulfide solid electrolyte material obtained in Example 1-1 was stable with respect to a Li metal, and thus high in resistance to reduction.

REFERENCE SIGNS LIST 1 cathode active material layer
2 anode active material layer
3 electrolyte layer
4 cathode current collector
5 anode current collector
6 battery case
10 battery

The invention claimed is:

1. A sulfide solid electrolyte material comprising:
a peak at a position of 2θ=29.86°±1.00° in X-ray diffraction measurement using a CuKα ray, and
a composition of Li$_{2y+3}$PS$_4$(0.1≤y≤0.175).

2. The sulfide solid electrolyte material according to claim 1, further comprising a peak at a position of 2θ=24.01°±1.00°.

3. A sulfide solid electrolyte material comprising: an octahedron O comprising a Li element and a S element, a tetrahedron T$_1$ comprising a P element and a S element, and a tetrahedron T$_2$ comprising a P element and a S element; the tetrahedron T$_1$ and the octahedron O sharing an edge, and the tetrahedron T$_2$ and the octahedron O containing a crystal structure sharing a corner, and
a composition of Li$_{2y+3}$PS$_4$(0.1≤y≤0.175).

4. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 1.

5. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 3.

6. A producing method for a sulfide solid electrolyte material, the sulfide solid electrolyte material being the sulfide solid electrolyte material according to claim 1, comprising:

an ion conductive material synthesizing step of synthesizing an ion conductive material not having $Li_2S$ using a raw material composition containing a constituent of the sulfide solid electrolyte material by mechanical milling; and a heating step of obtaining the sulfide solid electrolyte material by heating the ion conductive material.

7. The producing method for a sulfide solid electrolyte material according to claim 6, wherein a heating temperature in the heating step is in a range of 230° C. to 300° C.

8. A producing method for a sulfide solid electrolyte material, the sulfide solid electrolyte material being the sulfide solid electrolyte material according to claim 3, comprising:

an ion conductive material synthesizing step of synthesizing an ion conductive material not having $Li_2S$ using a raw material composition containing a constituent of the sulfide solid electrolyte material by mechanical milling; and a heating step of obtaining the sulfide solid electrolyte material by heating the ion conductive material.

9. The producing method for a sulfide solid electrolyte material according to claim 8, wherein a heating temperature in the heating step is in a range of 230° C. to 300° C.

* * * * *